(12) United States Patent  
Shrivastava

(10) Patent No.: US 10,855,333 B2  
(45) Date of Patent: Dec. 1, 2020

(54) CROSSTALK REDUCTION IN RECEIVER INDUCTIVE LOOP USING CAPTURING LOOP IN TRANSMITTING INDUCTIVE LOOP

(71) Applicant: TEXAS INSTRUMENTS INCORPORATED, Dallas, TX (US)

(72) Inventor: Kumar Anurag Shrivastava, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 232 days.

(21) Appl. No.: 16/021,175

(22) Filed: Jun. 28, 2018

(65) Prior Publication Data

US 2020/0007189 A1   Jan. 2, 2020

(51) Int. Cl.
*H04B 3/32* (2006.01)
*H04B 1/10* (2006.01)
*H04L 25/02* (2006.01)

(52) U.S. Cl.
CPC ............ *H04B 3/32* (2013.01); *H04B 1/10* (2013.01); *H04L 25/026* (2013.01); *H04L 25/0272* (2013.01)

(58) Field of Classification Search
None
See application file for complete search history.

(56) References Cited

U.S. PATENT DOCUMENTS

| 5,004,317 A * | 4/1991 | Jackson | G02B 6/4202 |
| | | | 361/760 |
| 5,084,797 A * | 1/1992 | Ohta | G11B 5/17 |
| | | | 360/121 |
| 5,594,680 A * | 1/1997 | Ohtake | G11C 7/00 |
| | | | 365/194 |
| 6,891,731 B1 * | 5/2005 | Herrell | H01L 23/49822 |
| | | | 257/E23.062 |

(Continued)

FOREIGN PATENT DOCUMENTS

RU   97875   9/2010

OTHER PUBLICATIONS

International Search Report in corresponding PCT Application No. PCT/US2019/038651, dated Oct. 3, 2019 (2 pages).

*Primary Examiner* — Christopher M Crutchfield
(74) *Attorney, Agent, or Firm* — John R. Pessetto; Charles A. Brill; Frank D. Cimino

(57) ABSTRACT

An inductively coupled multi-channel digital isolator where the transmitter and receiver inductive loops of a given channel are coplanar. In the case where two adjacent channels flow data in opposite directions, the receiver inductive loops of a given channel include a large, generally conventional loop portion and a small loop portion that is located inside the transmitter inductive loops of the adjacent channels. The sizes of the small loop portion and the conventional loop portion are generally in the ratio of the magnetic flux in the conventional loop portion to the magnetic flux in the transmitter inductive loop. This size relationship results in the voltage of the small loop portion being very close but (Continued)

opposite in sign to the voltage in the conventional loop portion. As a result, there is minimal crosstalk from the transmitter inductive loop of one channel to the receiver inductive loop of the adjacent channel.

11 Claims, 11 Drawing Sheets

(56) References Cited

U.S. PATENT DOCUMENTS

| | | |
|---|---|---|
| 2002/0150151 A1 | 10/2002 | Krone et al. |
| 2008/0267301 A1 | 10/2008 | Alfano et al. |
| 2011/0050383 A1* | 3/2011 | Tiemeijer ............ H01F 17/0006 336/226 |
| 2016/0087914 A1* | 3/2016 | Goswami ................ H04L 27/08 370/442 |

* cited by examiner

CROSSTALK REDUCTION IN RECEIVER INDUCTIVE LOOP USING CAPTURING LOOP IN TRANSMITTING INDUCTIVE LOOP

BACKGROUND

1. Field

The field is digital isolators.

2. Description of the Related Art

Digital isolators are used to allow signal transfer between environments that must remain electrically isolated. The simplest form of a digital isolator is an opto-coupler. In an opto-coupler a signal is provided to drive a photodiode. A phototransistor is configured to receive the light emitted from the photodiode. Electrical isolation is provided between the photodiode and the phototransistor simply by an air gap through which the light passes. However, there are many circumstances where opto-couplers do not provide adequate performance. Therefore, another class of digital isolators has developed which utilize a capacitive isolation barrier. Effectively one plate of a capacitor is present on the input side and the other plate of the capacitor is present on the output side, with the capacitive isolation barrier separating the capacitor plates. Capacitive isolation digital isolators have lower current requirement and higher frequency response, in general, than opto-couplers. However, modern ultralow power requirements have made even the lower power levels of capacitive isolation digital isolators insufficient in many instances.

Inductive loop digital isolators have been developed where a magnetic field is used to transfer energy across an isolation barrier, rather than the capacitive transfer of capacitive isolation digital isolators. Often digital isolators include a plurality of different channels in a single chip to provide higher densities. In some cases those multi-channel digital isolators have paths going in different directions. While this is not an issue for capacitive isolation digital isolators, this bi-directional configuration results in the potential for undesired crosstalk or cross-coupling in an inductive loop or transformer digital isolator. Various approaches can be used to minimize the crosstalk but those approaches either utilize much more space, by increasing inter-channel spacing, or reduce circuit values. Another approach stacks the receive and transmit inductive loops vertically, but this makes manufacturing much more challenging.

SUMMARY

In an inductively coupled multi-channel digital isolator the transmitter and receiver inductive loops of a given channel are coplanar. In the case where two adjacent channels flow data in opposite directions, the receiver inductive loops of a given channel include a large, generally conventional loop portion and a small loop portion that is located inside the transmitter inductive loops of the adjacent channels. The sizes of the small loop portion and the conventional loop portion are generally in the ratio of the magnetic flux in the conventional loop portion to the magnetic flux in the transmitter inductive loop. This size relationship results in the voltage of the small loop portion being very close but opposite in sign to the voltage in the conventional loop portion. As a result, there is minimal crosstalk from the transmitter inductive loop of one channel to the receiver inductive loop of the adjacent channel. This allows a more densely packed and coplanar arrangement of the inductive loops, making manufacturing more cost effective.

BRIEF DESCRIPTION OF THE FIGURES

For a detailed description of various examples, reference will now be made to the accompanying drawings in which:

FIGS. 1A-1 to 1A-4 are block diagrams providing more details on the digital isolator of FIG. 1.

FIG. 2 is a diagram illustrating configuration of and crosstalk between two channels of a multi-channel, inductive coupling digital isolator.

FIG. 3 is a side view diagram illustrating crosstalk between two channels of a multi-channel, inductive coupling digital isolator.

FIG. 4 is a diagram illustrating configuration of two channels of a multi-channel, inductive coupling digital isolator using first alternate receiver loop configuration.

DETAILED DESCRIPTION OF THE EXAMPLES

Figure 1:
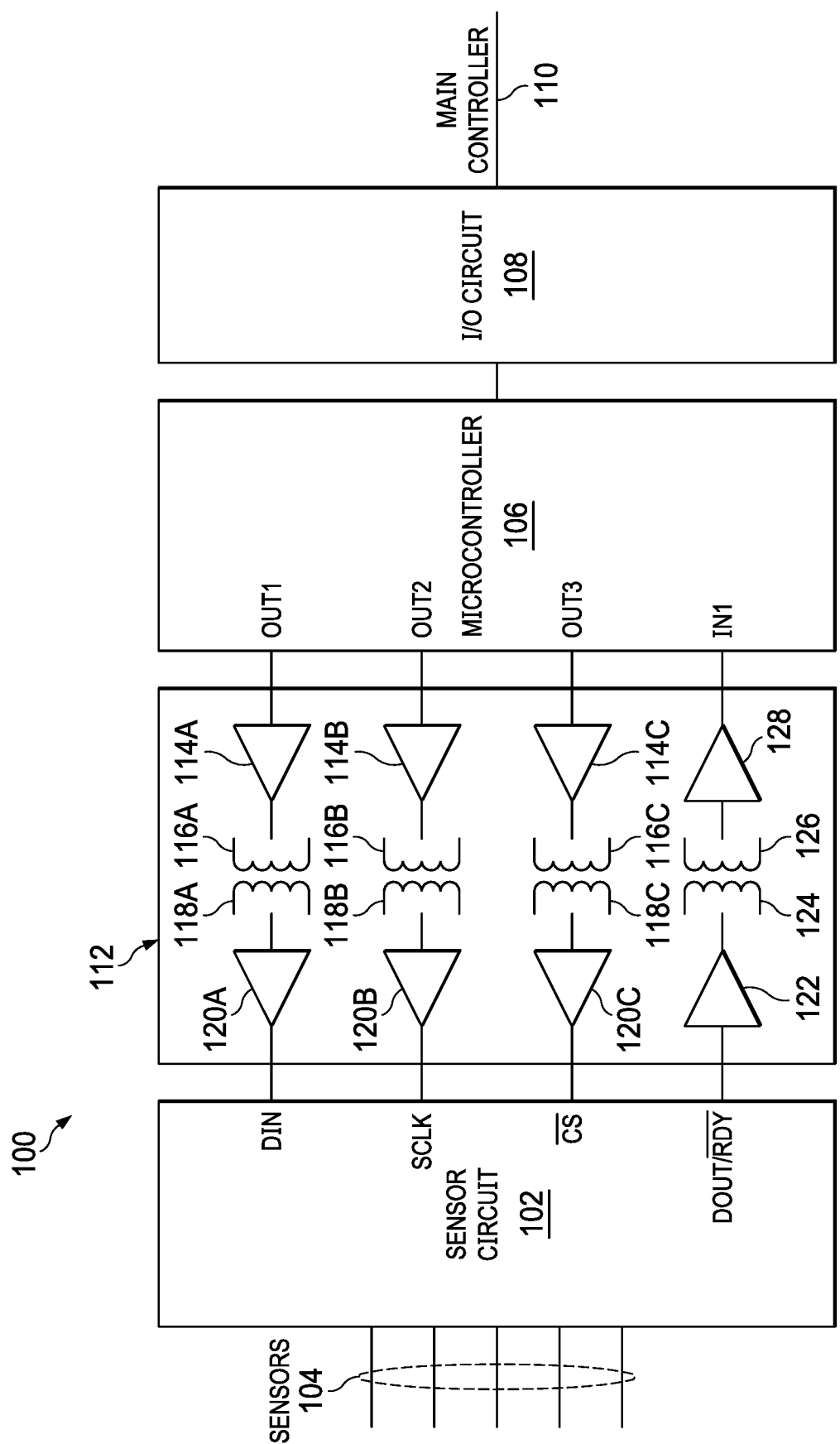
FIG. 1 is a block diagram of a sensor including a multi-channel, inductive coupling digital isolator.
Figures 1, 1A:
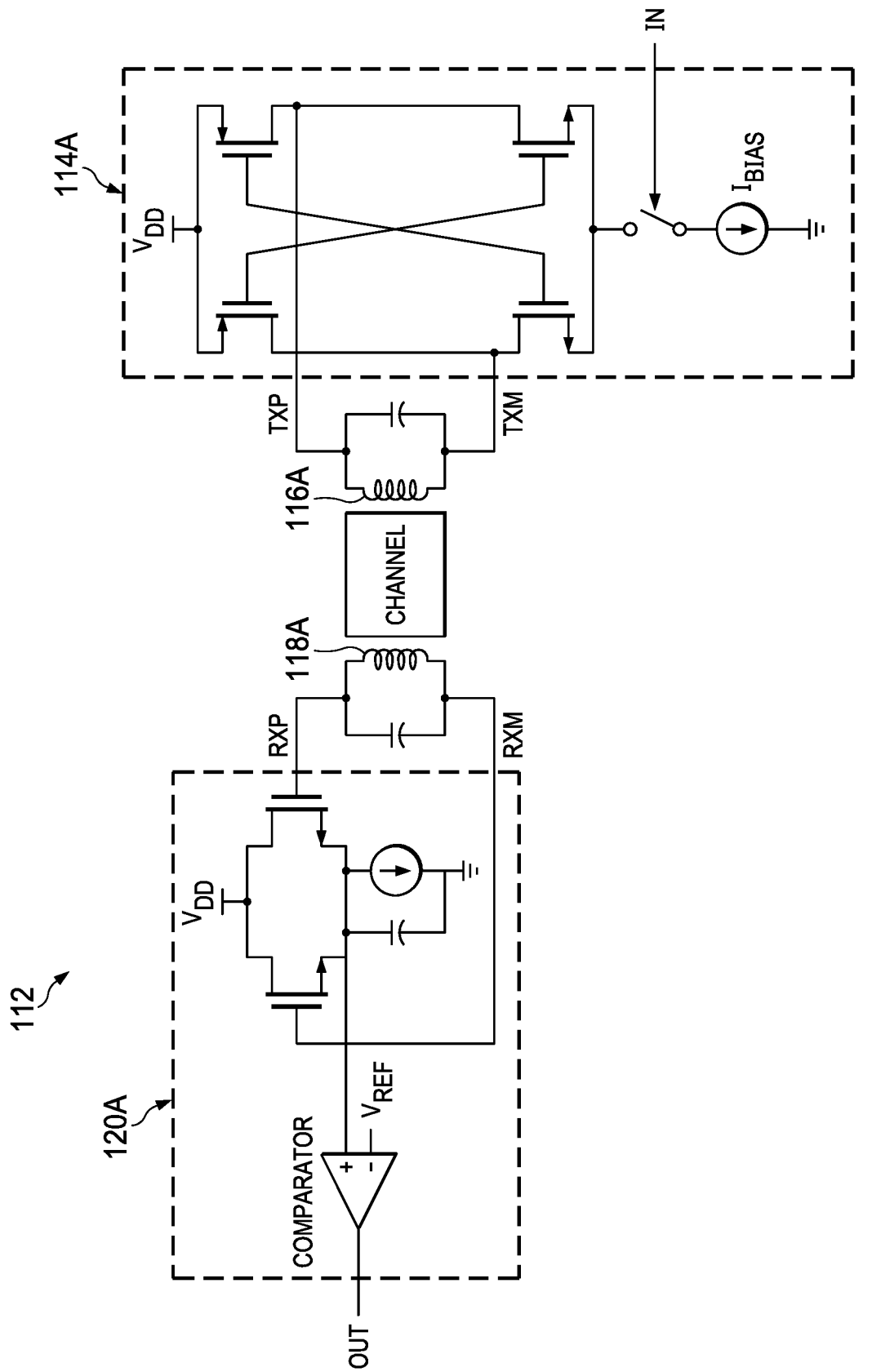

Referring now to FIG. 1, an example use of a digital isolator is provided. A sensor module 100 includes a sensor circuit 102 which is connected to various sensors 104 that are being monitored. A microcontroller 106 provides the intelligence for the sensor module 100. An input/output (I/O) circuit 108 is connected to the microcontroller 106 and to a main controller no to provide the sensor readings to the main control system. The sensor circuit 102 and the microcontroller 106 are connected by a digital isolator 112. The digital isolator 112 is a four channel device with three channels being connected to transfer data from the microcontroller 106 to the sensor circuit 102 and one channel connected to transfer data from the sensor circuit 102 to the microcontroller 106. The digital isolator 112 is an inductive isolation device which uses inductive loops to transfer the signal across the isolation barrier. Receiver circuitry 114A receives the output signal from the OUT1 output of the microcontroller 106. Receiver circuitry 114B receives the output signal from the microcontroller 106 OUT2 output, while receiver circuitry 114C receives the OUT3 signal from the microcontroller 106. The outputs of the receiver circuitry 114A, 114B, 114C are provided to transmitter inductive loops 116A, 116B, 116C. Receiver inductive loops 118A, 118B, 118C are coupled to the transmitter inductive loops 116A, 116B, 116C. Drivers 120A, 120B and 120C are connected to the receiver inductive loops 118A, 118B, 118C. The driver 120A is connected to the DIN or data input pin of the sensor circuit 102. The driver 120B is connected to the SCLK or serial clock input of the sensor circuit 102. The driver 120C is connected to the CS or chip select input of the sensor circuit 102. The DOUT or data out or ready signal from the sensor circuit 102 is provided to receiver circuitry 122. The receiver circuitry 122 is connected to the transmitter inductive loop 124, which is coupled to the receiver inductive loop 126. A driver 128 is connected to the receiver inductive loop 126 and is connected to the IN1 signal of the microcontroller 106. Thus, the digital isolator 112 handles the signals for a serial interface between the microcontroller 106 and the sensor circuit 102. It is understood that this is just a simple example to illustrate the use of digital isolators, particularly multichannel isolators where data flows in different directions in the particular isolator.

FIGS. 1A-1 to 1A-4 provide more details of the circuitry inside the inductive isolation digital isolator 112. As the four channels are identical electrically, so only a single channel is described here. The input signal to the receiver circuitry 122 controls a switch 150. The switch 150 is connected between a current source 152 connected to ground and a bridge circuit 154. The bridge circuit 154 is formed by cross-coupled n-channel and p-channel enhancement metal-oxide-semiconductor field-effect transistor (MOSFET) pairs 156 and 158. The first pair 156 has the source of a p-channel enhancement MOSFET 160 connected to $V_{DD}$ and the gates of the p-channel enhancement MOSFET 160 and an n-channel enhancement MOSFET 162 connected. The source of the n-channel enhancement MOSFET 162 is connected to the switch 150. The second pair has the source of a p-channel enhancement MOSFET 164 connected to $V_{DD}$ and the gates of the p-channel enhancement MOSFET 164 and an n-channel enhancement MOSFET 166 connected. The source of the n-channel enhancement MOSFET 166 is connected to the switch 150. The drains of the p-channel enhancement MOSFET 160 and the n-channel enhancement MOSFET 166 are connected and provide a TXP or transmit positive signal. The drains of the p-channel enhancement MOSFET 164 and the n-channel enhancement MOSFET 162 are connected and provide a TXM or transmit minus signal. The TXP and TXM signals are provided to the transmitter inductive loop 124 and a parallel capacitor 168. The parallel capacitor 168 can be a separate capacitor or can be the inherent capacitance of the transmitter inductive loop 124. A channel 170 is the isolation between the transmitter inductive loop 124 and the receiver inductive loop 126. In this configuration the MOSFETs 160, 162, 164 and 166 act as an oscillator at the resonant frequency of the transmitter inductive loop 124 and the capacitor 168.

The RXP or receive positive and RXM or receive minus signals are developed across the receiver inductive loop 126 and a parallel capacitor 172. The parallel capacitor 172 can be a separate capacitor or can be the inherent capacitance of the transmitter inductive loop 126. The RXP signal is provided to the gate of an n-channel enhancement MOSFET 174, while the RXM signal is provided to the gate of an n-channel enhancement MOSFET 176. The drains of the n-channel enhancement MOSFET 174 and the n-channel enhancement MOSFET 176 are connected to $V_{DD}$. The sources of the n-channel enhancement MOSFET 174 and the n-channel enhancement MOSFET 176 are connected to a current source 178, which is connected to ground. A capacitor 180 is provided in parallel with the current source 178. In this configuration the MOSFETs 174 and 176 act as a rectifier. The connection of the sources of the n-channel enhancement MOSFET 174 and the n-channel enhancement MOSFET 176 is also provided to the non-inverting input of a comparator 182, with the inverting input connected to $V_{REF}$. The output of the comparator 182 is the output of the digital isolator 112.

In operation, when the input is a one or high, the switch 150 is closed and the bridge circuit 154 is driving the transmitter inductive loop 124 to create the magnetic field captured by the receiver inductive loop 126. The signal from the receiver inductive loop 126 is rectified and compared to a reference. As the switch 150 is closed, the rectified voltage will exceed the reference and the comparator 182 will drive a high or one output. When the input signal is low, the switch 150 is open and there is no magnetic field produced by the transmitting inductive loop 124, so the rectified voltage will be low, below the reference, and the output of the comparator 182 is low or zero.

It is understood that these are example receiver and driver circuits for purpose of illustration and other designs can be used.

Figures 1, 1A, 2:
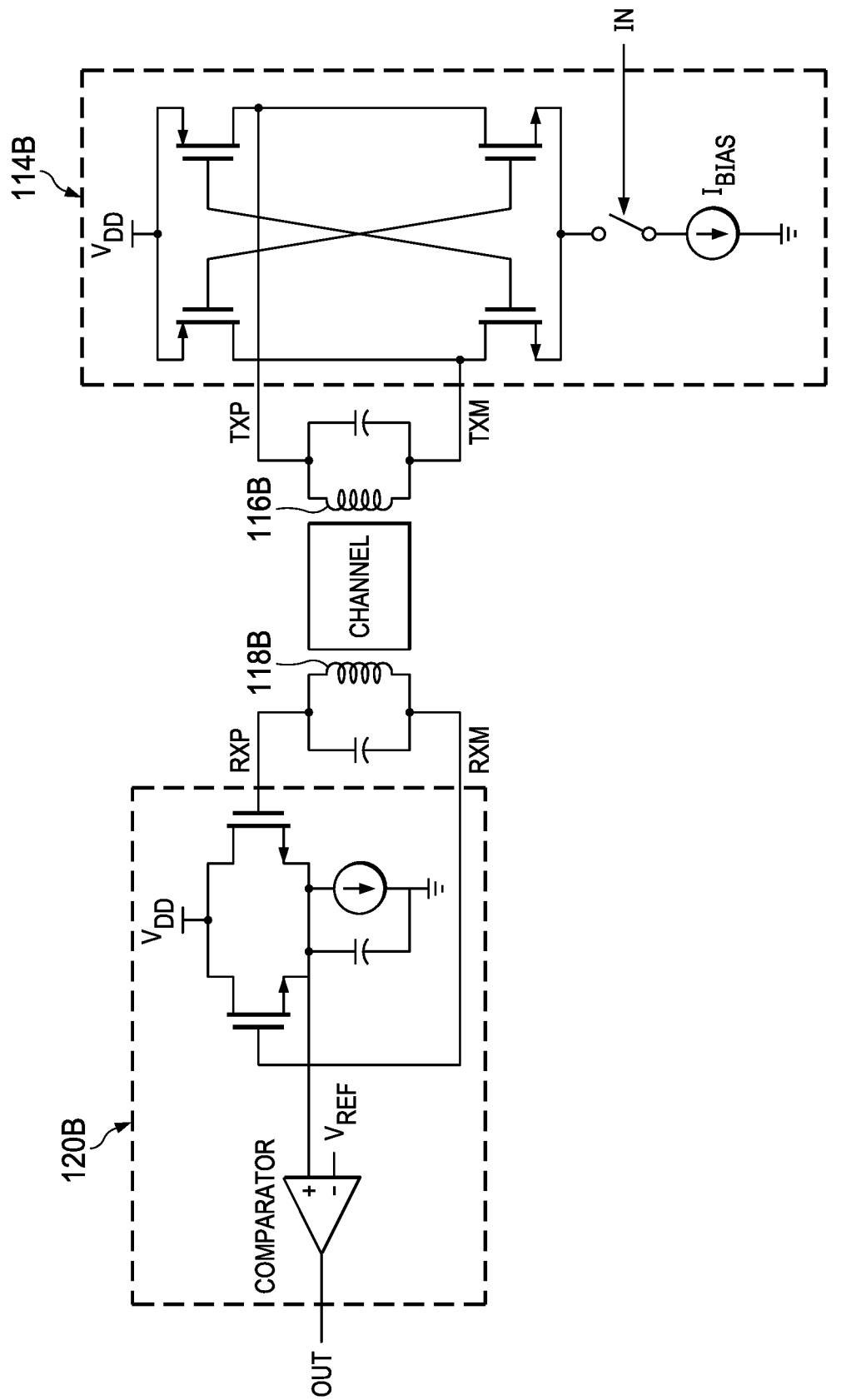
Figure 7:
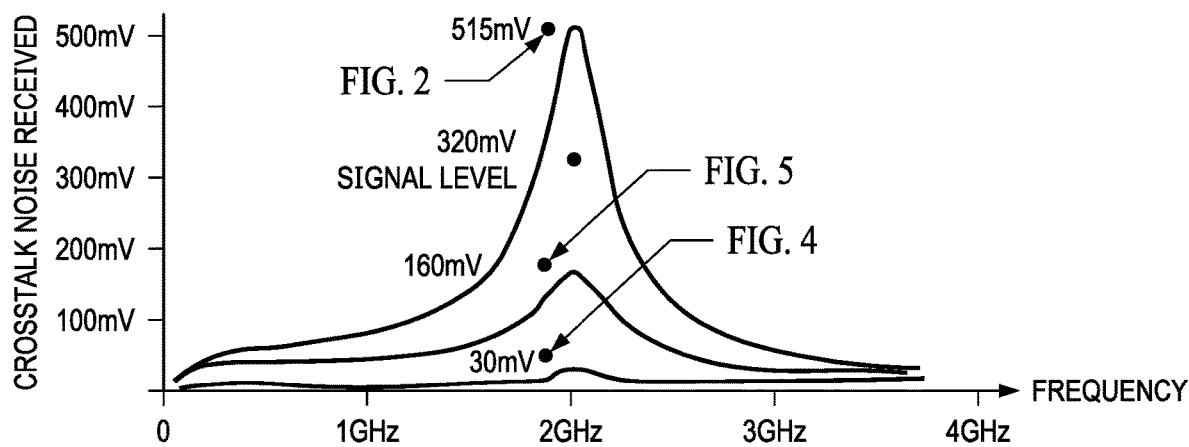
FIG. 7 is a graph illustrating crosstalk of the receiver inductive loops of FIGS. 2, 4 and 5.

FIG. 2 illustrates an arrangement of loops and inductive loops according to the prior art. A first channel 202 has data flowing in one direction, while a second channel 204 has data flowing in an opposite direction. The data in the first channel 202 is provided to a TX1 transmitter inductive loop 206, which is coupled to an RX1 receiver inductive loop 208. Similarly a TX2 transmitter inductive loop 210 receives the data being transmitted on channel 2 and couples to an RX2 receiver inductive loop 212 to provide the data. In the drawing of FIG. 2, the four inductive loops 206, 208, 210, 212 are arranged in a grid. The transmitter and receiver inductive loops 206, 208 and 210, 212 of a given channel 202, 204 are located 700-1000 µm apart in one design and are substantially coplanar as they are formed in the same process steps in one design. In one design the transmitter and receiver inductive loops 206, 208, 210, 212 are formed from seven to eight turns of the conductor. Being substantially coplanar allows the digital isolator to formed using conventional integrated circuit processing techniques and does not require elaborate three dimensional structures. Each inductive loop 206, 208, 210, 212 has a size of approximately 400 µm by 200 µm in one design. The transmitter inductive loops 206, 210 of one channel are located 300-500 µm from the receiver inductive loop 212, 208 of the other channel. Dimensions are provided on FIG. 2, which is not drawn to scale for illustrative purposes. These dimensions and numbers of turns are design-based and can vary as needed for a particular design. FIG. 2 shows exemplary magnetic flux lines 220 emanating from TX2 transmitter inductive loop 210. As can be seen, the magnetic flux density in the RX2 receiver inductive loop 212 is not dissimilar to the magnetic flux density in the RX1 receiver inductive loop 208. This leads to a situation where the TX2 to RX1 crosstalk may actually exceed the TX1 to RX1 signal itself. Referring to FIG. 7, the desired signal level is 320 mV while the crosstalk is 515 mV, actually higher than the signal level. This would result in significant data transmission errors.

Figures 1, 1A, 2, 3:
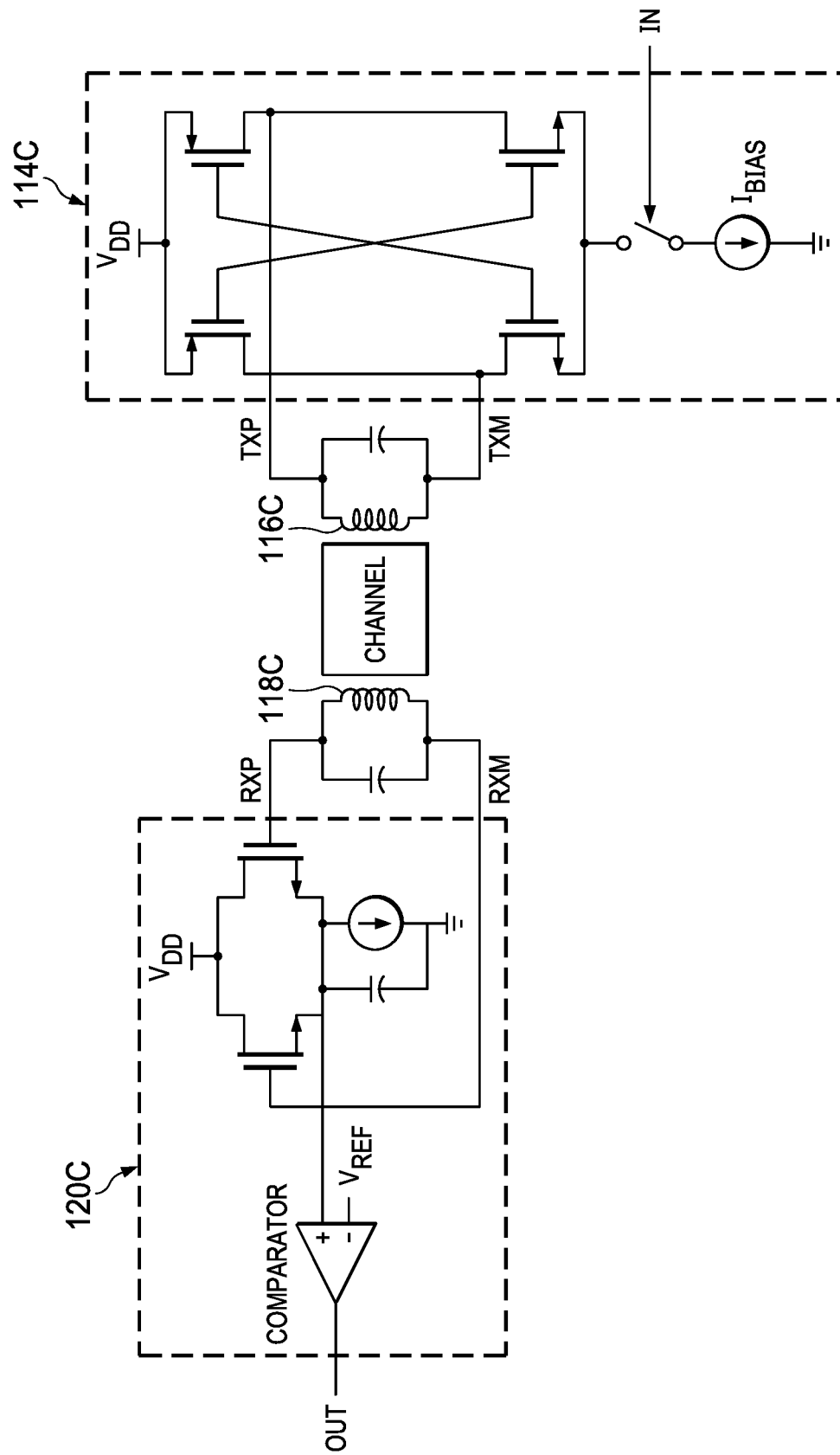

FIG. 3 is an alternate view of the inductive loops of FIG. 2. The view of FIG. 3 is a side view, which shows that the third dimension of the magnetic flux lines 220 and the substantially coplanar nature of the adjacent channels.

Figures 1, 1A, 2, 3, 4:
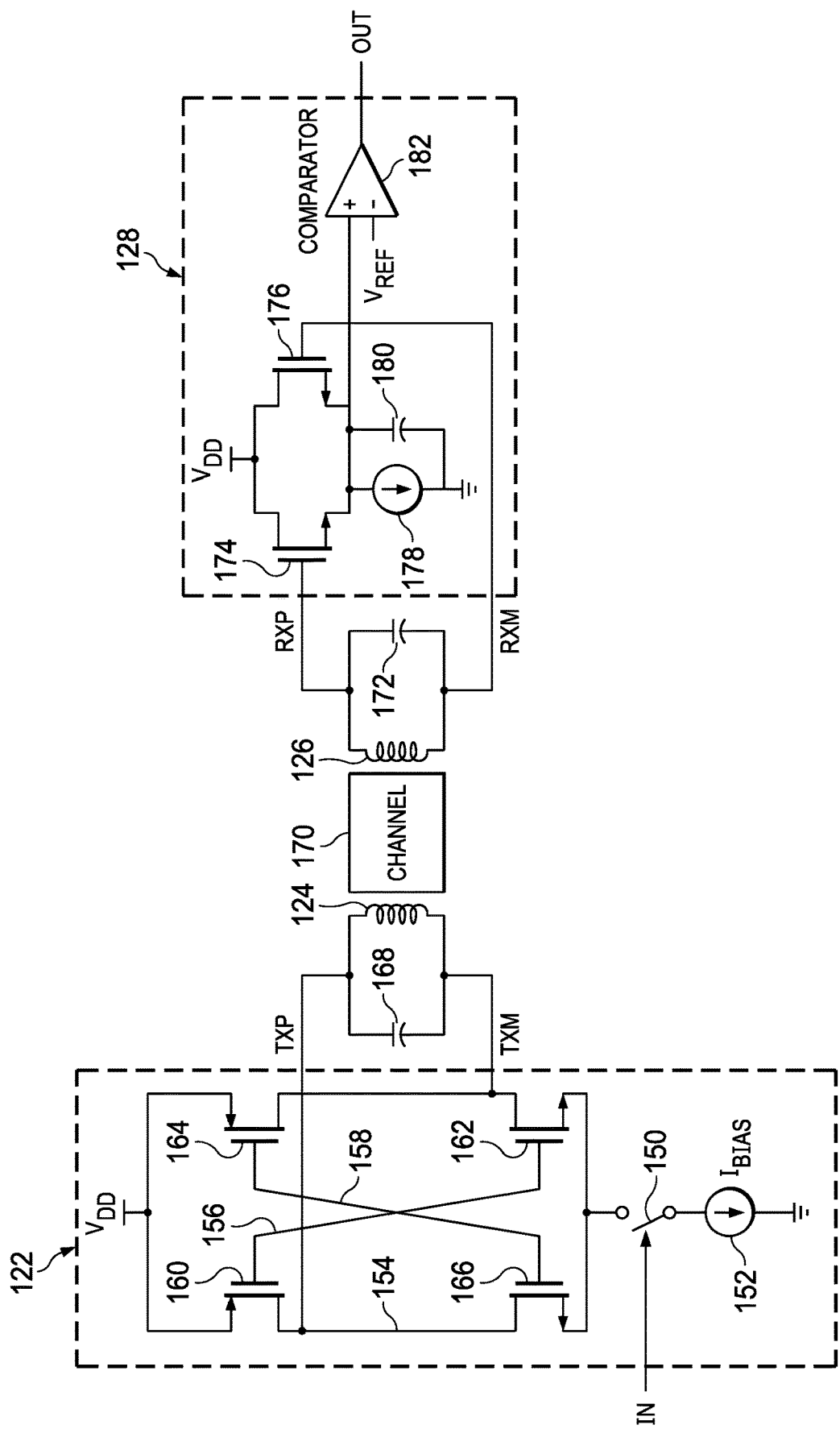
Figure 2:
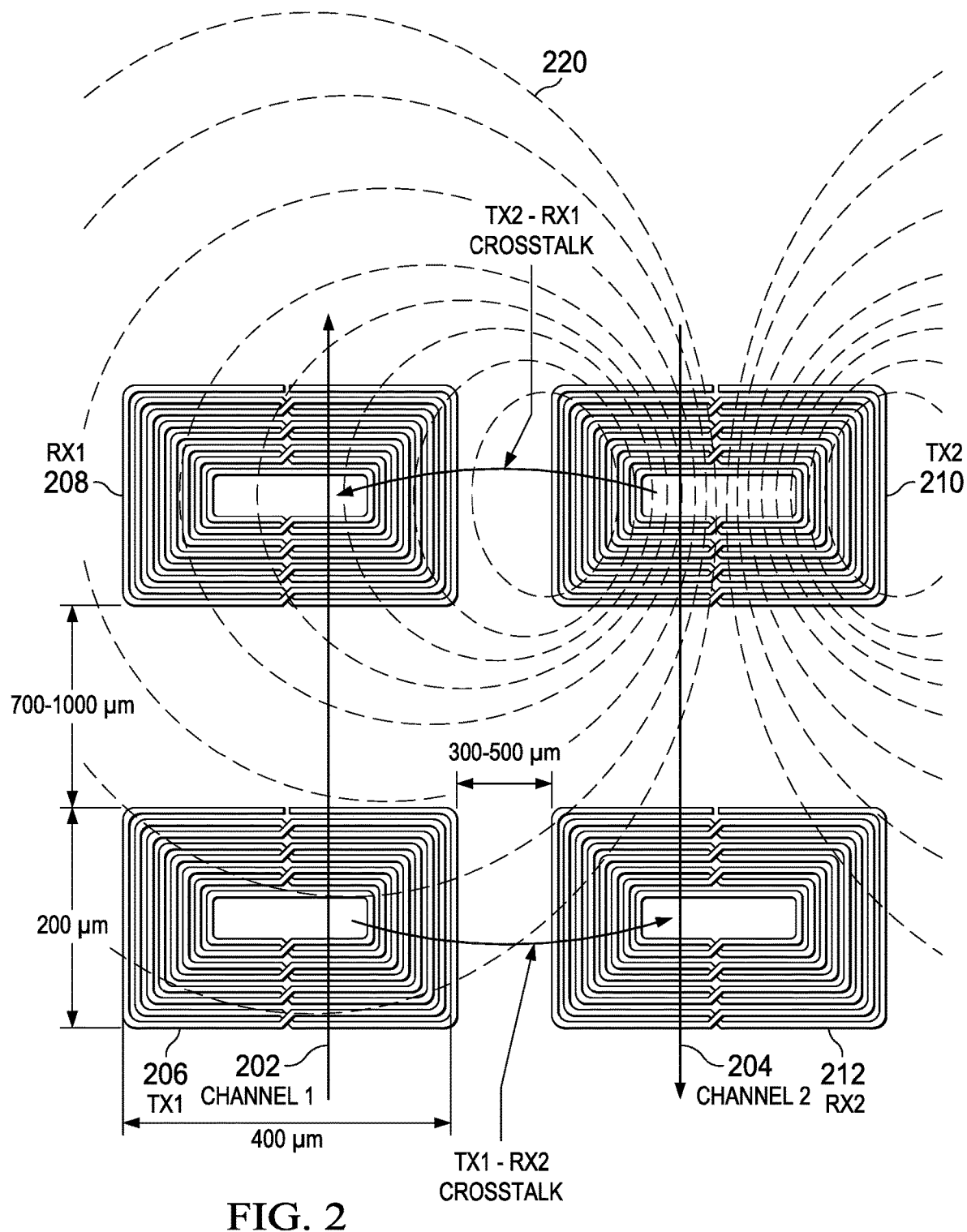
Figure 3:
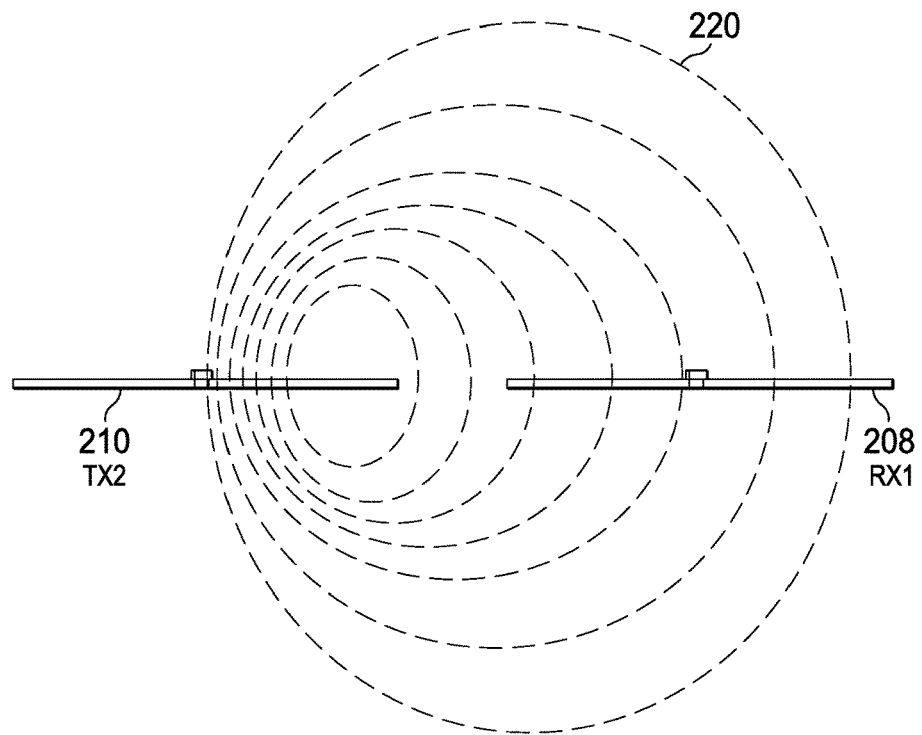
Figure 4:
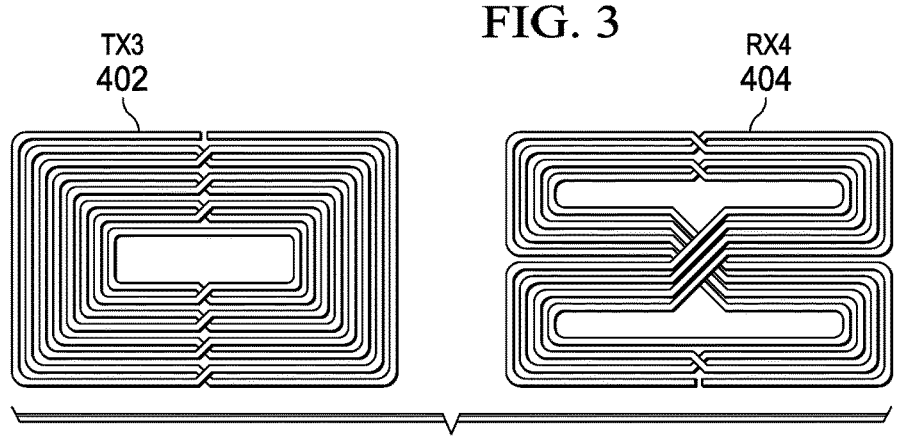

FIG. 4 shows a transmitter inductive loop 402 similar to the transmitter inductive loops 206 and 210 but a second design of a receiver inductive loop 404. The receiver inductive loop 404 has been reconfigured to be in roughly a FIG. 8 shape. Referring to FIG. 7, this configuration of the receiver inductive loop 404 does reduce the crosstalk to a value of 30 mV but at the disadvantage of changing the impedance of the inductive loops. An inductive loop such as those of receiver inductive loop 208 and receiver inductive loop 212 have a tank impedance of 1.1 kΩ, while the configuration of FIG. 4 has a tank impedance of 450Ω. This reduced impedance results in a reduced Q for the loop. Reducing the Q of the loop has the undesirable effect of impacting the signal-noise ratio (SNR) of the circuits, which complicates the entire design.

Figure 5:
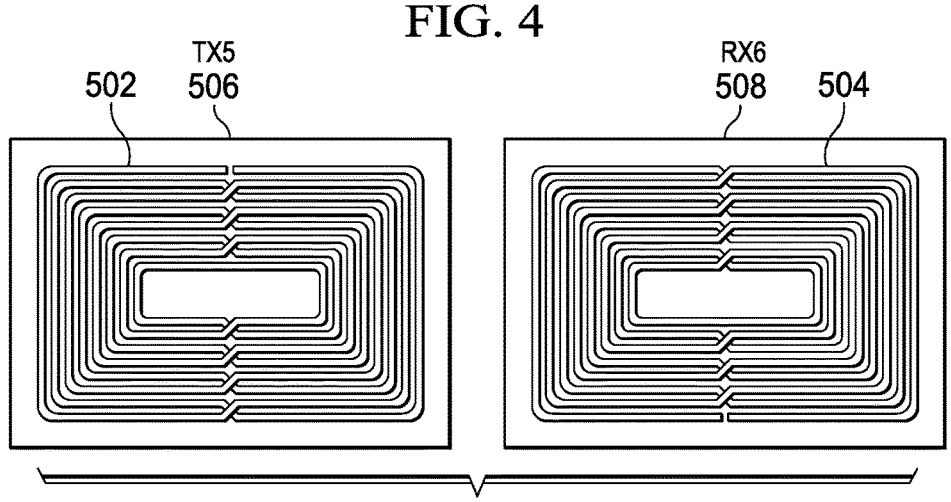
FIG. 5 is a diagram illustrating configuration of two channels of a multi-channel, inductive coupling digital isolator using shielding around the loops.
Figure 6:
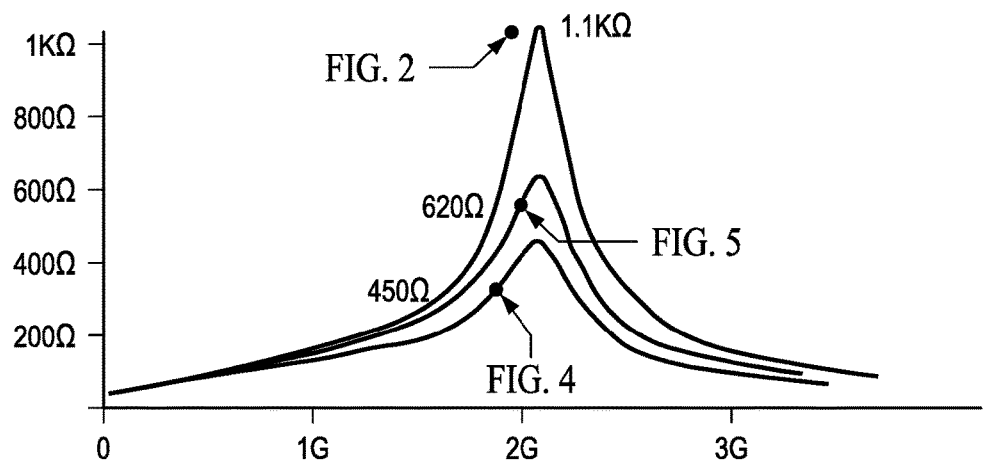
FIG. 6 is a graph illustrating impedance of the transmitter inductive loops of FIGS. 2, 4 and 5.

A alternative design is illustrated in FIG. 5, where the inductive loops of FIG. 2, referred to in FIG. 5 as a transmitter inductive loop 502 and a receiver inductive loop 504, are encircled by shielding 506 and 508. The shielding does reduce the crosstalk as indicated in FIG. 7, where the crosstalk is reduced to the 160 mV but the presence of the shielding also further decreases the tank impedance to 620Ω as shown in FIG. 6, again causing the impedance problems. The Q of the loop can be maintained but only at the expense further separating the various loops as greater distance is needed between the shields and the loops, which increase chip size undesirably.

Therefore, while the prior art does provide ways of reducing crosstalk, the prior art designs reduce the crosstalk at the expense of also decreasing the circuit impedance with its resulting problems of degraded SNR.

Figure 8:
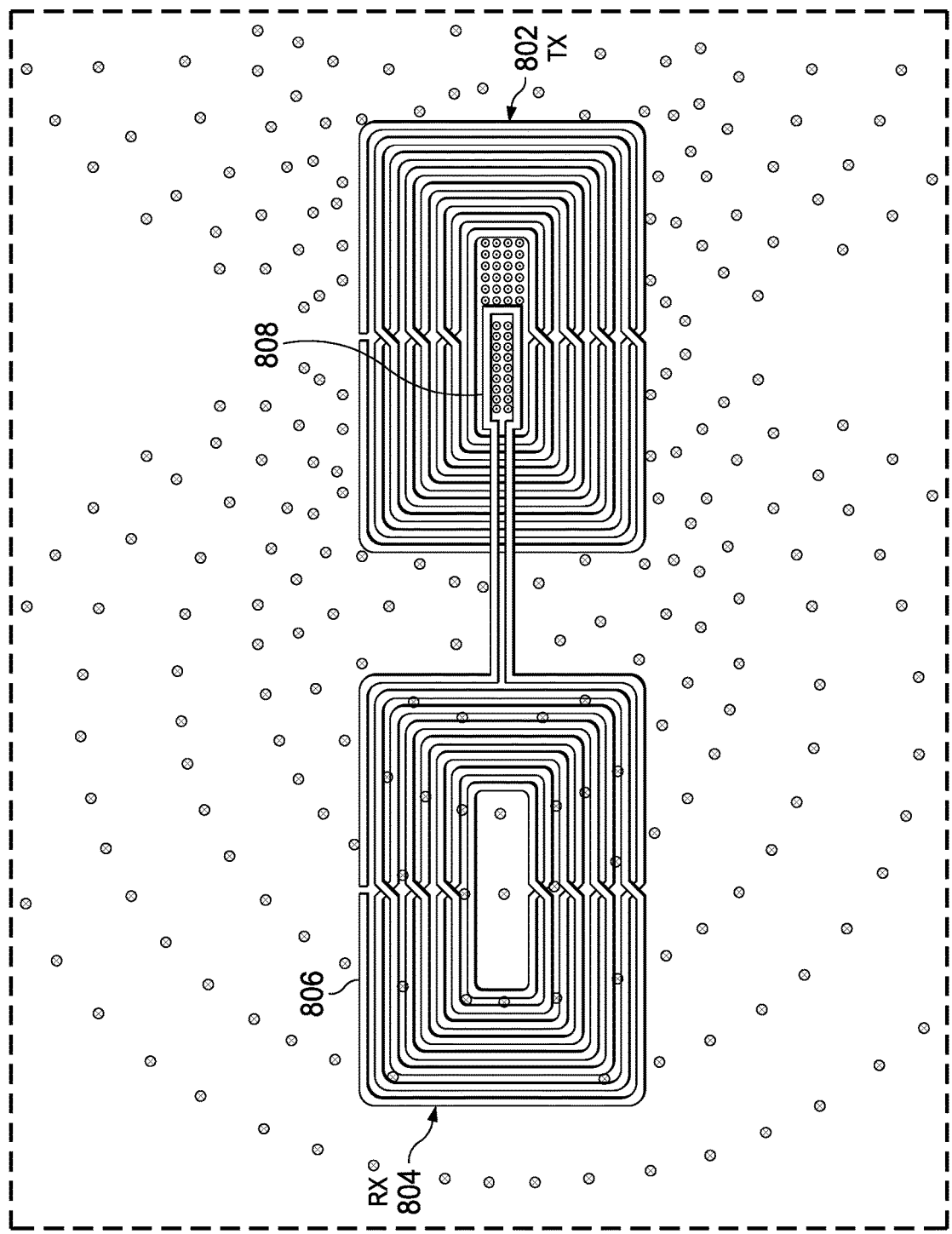
FIG. 8 is a diagram illustrating configuration of two channels of a multi-channel, inductive coupling digital isolator having reduced crosstalk.

FIG. 8 is a drawing of a reduced crosstalk configuration which still maintains high impedance and high Q for the loops. The transmitter inductive loop 802 is configured similarly to that of the FIG. 2 prior art, such as transmitter inductive loops 206 and 210. A receiver inductive loop 804 is divided into two portions. A first portion 806 is a conventional portion, while a second portion 808 is added which interacts with the flux lines inside the transmitter inductive loop 802. This means that the receiver inductive loop 804 is coupling with both positive and negative flux lines and their values are being summed. By properly sizing the areas of the first portion 806 and the second portion 808 and taking into account the densities of the flux lines, any crosstalk based on a signal from the transmitter inductive loop 802 is greatly reduced.

The crosstalk on the RX receiver inductive loop 804 based on the TX transmitter inductive loop 802 is given by the following equation, where X is the RX receiver inductive loop 804 and Y is the TX transmitter inductive loop 802:

$$V_X = \oint B_Y dA_X$$

Where B is the magnetic flux density, d is the distance and A is the area.

Because the RX receiver inductive loop 804 has a first portion 806, X2, and a second portion 808, X1, the equation is modified to account for the separate areas and the inversion of the magnetic flux between the two portions 806, 808.

$$V_X = \oint B_{+Y} dA_{X1} + \oint B_{-Y} dA_{X2}$$

To make the crosstalk voltage zero, $V_X=0$, assume that such is the case and then note that $B_{+Y}$ and $B_{-Y}$ are out of phase, which results in the following equation:

$$\oint B_{+Y} dA_{X1} = \oint B_{-Y} dA_{X2}$$

This equation reduces to:

$$\frac{B_{+Y}}{B_{-Y}} = \frac{A_{X2}}{A_{X1}}$$

In one design the ratio of $B_{+Y}:B_{-Y}$ was 95:5, as the magnetic flux inside the loop is much greater than the magnetic flux outside the loop. Hence, the area of X2, first portion 806, needs to be 95 times the size of the area of X1, second portion 808. This ratio will vary based on many factors, including loop size, loop spacing, number of turns and the like.

A ratio this size also means that the Q of the receiver inductive loop 804 is very close to the Q of the receiver inductive loop 208, so that the impedance and other loop properties are effectively unchanged from the original receiver inductive loop 208.

Figure 10:
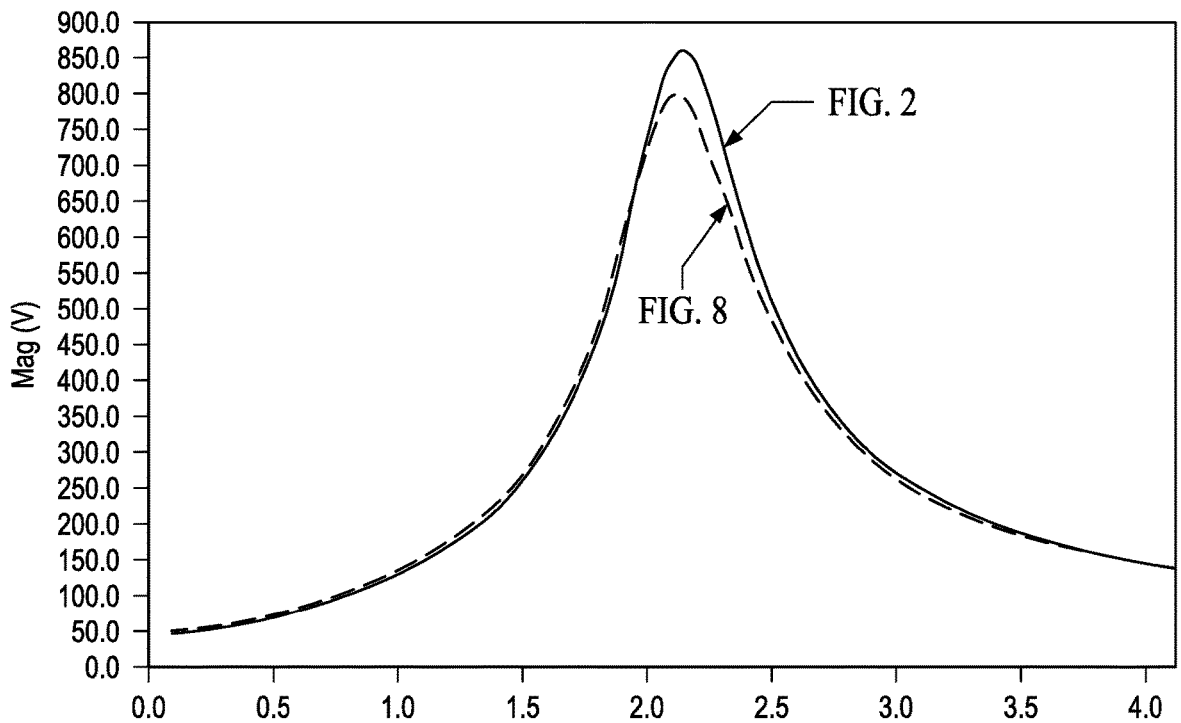
FIG. 10 is a graph illustrating impedance of the transmitter inductive loops of FIGS. 2 and 6.
Figure 11:
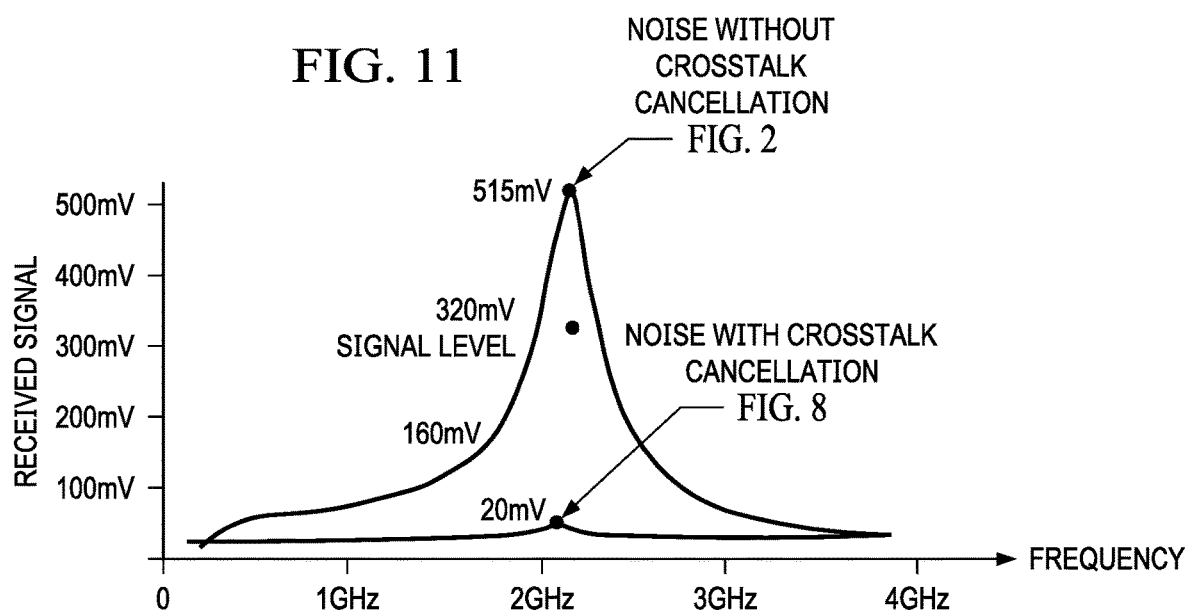
FIG. 11 is a graph illustrating crosstalk of the receiver inductive loops of FIGS. 2 and 6.

FIG. 11 illustrates the crosstalk change between the receiver inductive loop 208 and the receiver inductive loop 804. The 515 mV level of the noise without crosstalk cancellation according to FIG. 2 is illustrated in comparison to the 320 mV normal signal for the channel and the greatly reduced 20 mV signal for the crosstalk for the design of FIG. 8, where the receiver inductive loop has the two portions. FIG. 10 illustrates that the impedance of the receiver inductive loop of FIG. 8 with the two portions is only nominally less than the receiver inductive loop of the prior art design of FIG. 2, which allows simplified circuit design.

Figure 9:
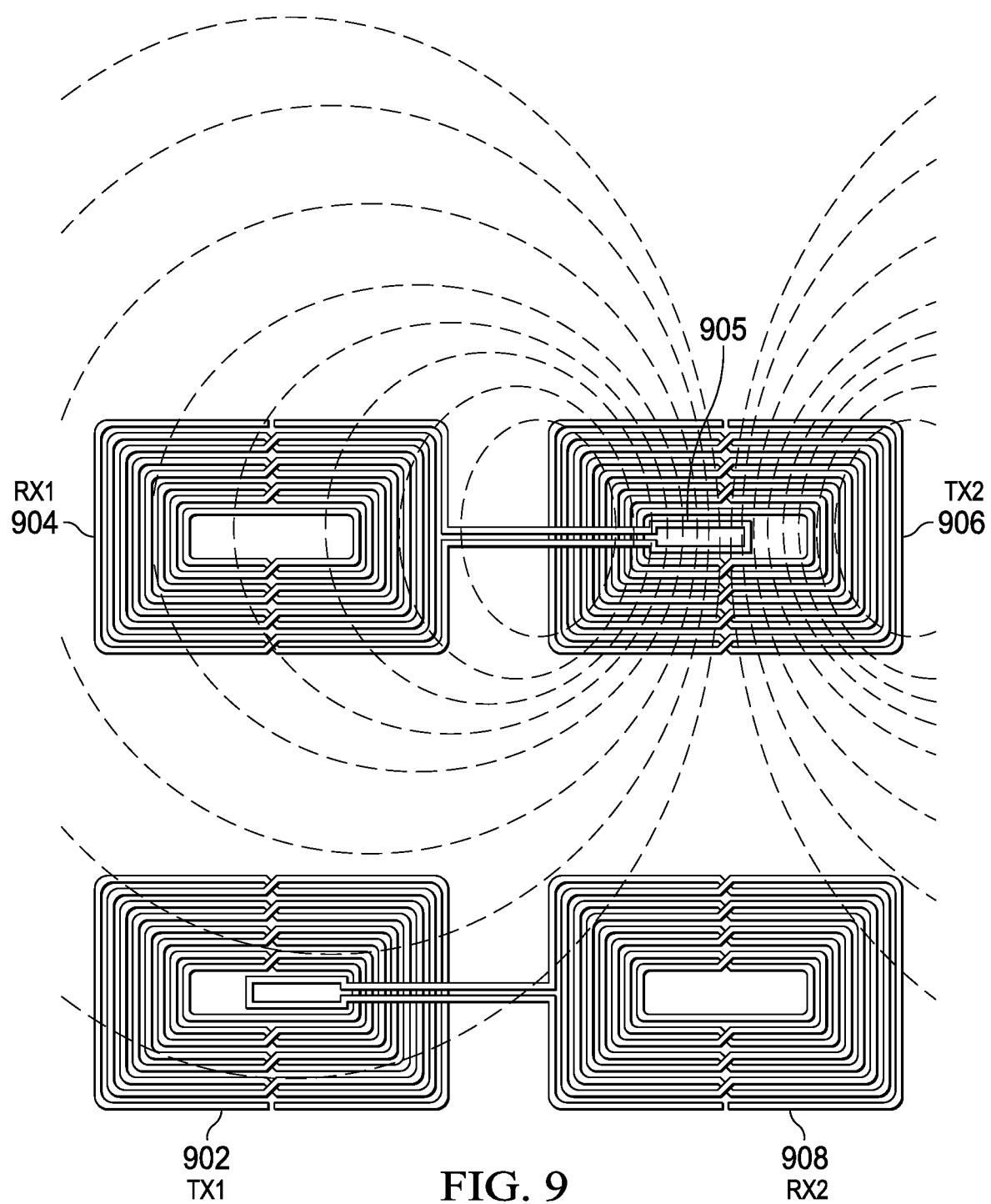
FIG. 9 is a diagram illustrating the two channels of a multi-channel, inductive coupling digital isolator having reduced crosstalk in the configuration of FIG. 2.

FIG. 9 illustrates the design of FIG. 8 for two channels in different directions. A first channel TX1 transmitter inductive loop 902 is associated with a first channel RX1 receiver inductive loop 904. A second channel TX2 transmitter inductive loop 906 is associated with a second channel RX2 receiver inductive loop 908. The distances between the various transmitter inductive loops 902, 906 and the various receiver inductive loops 904, 908 represent the isolation barriers between them. In one design, the transmitter inductive loop and the receiver inductive loop of a given channel are on separate dies, though the transmitter inductive loop and the receiver inductive loop would be on the same die. As can be seen by the magnetic flux line indications in FIG. 9, the receiver inductive loop 908 for the second channel is receiving the normal amount of flux lines but the receiver inductive loop 904 of the first channel has minimal signal crosstalk because of the action of the second portion 905 located inside the transmitter inductive loop 906 of the second channel.

The inductive loops of the third and fourth channels are not illustrated by the receiver inductive loops do not contain the second portion located in the transmitter inductive loop of a different channel as the receiver inductive loop of the third channel is adjacent the receiver inductive loop of the second channel and not the transmitter inductive loop, as the channels are flowing data in the same direction. Similarly, the receiver inductive loop of the third channel is adjacent the receiver inductive loop of the fourth channel and not the transmitter inductive loop, as the channels are flowing data in the same direction. The receiver inductive loops with the portions inside the transmitter inductive loops are only needed for adjacent channels where data is flowing in different directions.

By using the small receiver loop portion inside the transmitter inductive loop, the crosstalk is reduced so that a more manufacturable coplanar configuration can be used but the inductive loops can still be more compactly arranged.

The above description is intended to be illustrative, and not restrictive. For example, the above-described examples may be used in combination with each other. Many other examples will be apparent upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A multi-channel inductively coupled digital isolator comprising:
a first channel and a second channel, each channel including:
receiver circuitry for receiving an input signal;
a transmitter inductive loop coupled to the receiver circuitry;
a receiver inductive loop inductively coupled to the transmitter inductive loop; and
a driver coupled to the receiver inductive loop for providing an output signal,
wherein the transmitter inductive loop and the receiver inductive loop are located adjacent each other,
wherein the first channel transmitter inductive loop is located adjacent the second channel receiver inductive loop and the second channel transmitter inductive loop is located adjacent the first channel receiver inductive loop,
wherein the first channel receiver inductive loop includes a portion of the loop inside the second channel transmitter inductive loop, and
wherein the second channel receiver inductive loop includes a portion of the loop inside the first channel transmitter inductive loop;
wherein the receiver circuitry includes an oscillator coupled to the transmitter inductive loop and a switch coupled to the input signal to control operation of the oscillator.

2. The digital isolator of claim 1, wherein the transmitter inductive loop and the receiver inductive loop of each channel are generally coplanar.

3. The digital isolator of claim 2, wherein the first channel receiver inductive loop and the second channel transmitter inductive loop are generally coplanar, and
wherein the second channel receiver inductive loop and the first channel transmitter inductive loop are generally coplanar.

4. The digital isolator of claim 1, wherein the transmitter inductive loop includes a plurality of turns of a conductor.

5. The digital isolator of claim 1, wherein the receiver inductive loop includes a first portion having a plurality of turns of a conductor and a second portion forming the portion of the loop inside the respective transmitter inductive loop has at least one turn of a conductor.

6. The digital isolator of claim 5, wherein a ratio of sizes of the first portion and second portion of the receiver inductive loop is substantially $$\frac{B_{+Y}}{B_{-Y}} = \frac{A_{X_2}}{A_{X_1}}$$

where Y is the transmitter inductive loop,
where B is magnetic flux density,
where A is area,
where X2 is the first portion, and
where X1 is the second portion.

7. A multi-channel inductively coupled digital isolator comprising:
a first channel and a second channel, each channel including:
receiver circuitry for receiving an input signal;
a transmitter inductive loop coupled to the receiver circuitry;
a receiver inductive loop inductively coupled to the transmitter inductive loop; and
a driver coupled to the receiver inductive loop for providing an output signal,
wherein the transmitter inductive loop and the receiver inductive loop are located adjacent each other,
wherein the first channel transmitter inductive loop is located adjacent the second channel receiver inductive loop and the second channel transmitter inductive loop is located adjacent the first channel receiver inductive loop,
wherein the first channel receiver inductive loop includes a portion of the loop inside the second channel transmitter inductive loop, and
wherein the second channel receiver inductive loop includes a portion of the loop inside the first channel transmitter inductive loop;
wherein the driver includes a rectifier coupled to the receiver inductive loop, a capacitor and a comparator.

8. A multi-channel inductively coupled digital isolator comprising:
a first channel and a second channel, each channel including:
receiver circuitry for receiving an input signal;
a transmitter inductive loop coupled to the receiver circuitry;
a receiver inductive loop inductively coupled to the transmitter inductive loop; and
a driver coupled to the receiver inductive loop for providing an output signal,
wherein the transmitter inductive loop and the receiver inductive loop are located adjacent each other,
wherein the first channel transmitter inductive loop is located adjacent the second channel receiver inductive loop and the second channel transmitter inductive loop is located adjacent the first channel receiver inductive loop,
wherein the first channel receiver inductive loop includes a portion of the loop inside the second channel transmitter inductive loop, and
wherein the second channel receiver inductive loop includes a portion of the loop inside the first channel transmitter inductive loop;
further comprising:
a third channel and a fourth channel, each channel including:
receiver circuitry for receiving an input signal;
a transmitter inductive loop coupled to the receiver circuitry;
a receiver inductive loop inductively coupled to the transmitter inductive loop; and
a driver coupled to the receiver inductive loop for providing an output signal,
wherein the transmitter inductive loop and the receiver inductive loop are located adjacent each other,
wherein the third channel transmitter inductive loop is located adjacent the second channel transmitter inductive loop and the third channel receiver inductive loop is located adjacent the second channel receiver inductive loop, and
wherein the third channel transmitter inductive loop is located adjacent the fourth channel transmitter inductive loop and the third channel receiver inductive loop is located adjacent the fourth channel receiver inductive loop.

9. The digital isolator of claim 8, transmitter inductive loop and the receiver inductive loop of each channel are generally coplanar.

10. The digital isolator of claim 9, wherein the wherein the first channel receiver inductive loop and the second channel transmitter inductive loop are generally coplanar, and wherein the second channel receiver inductive loop and the first channel transmitter inductive loop are generally coplanar.

11. The digital isolator of claim 8, wherein the third channel receiver inductive loop and the fourth channel receiver inductive loop do not have portions inside a transmitter inductive loop.

\* \* \* \* \*